United States Patent [19]

Uehara

[11] Patent Number: 5,381,399

[45] Date of Patent: Jan. 10, 1995

[54] HEAD SHIFTING APPARATUS

[75] Inventor: Tsukasa Uehara, Tokyo, Japan

[73] Assignee: Canon Kabushiki Kaisha, Tokyo, Japan

[21] Appl. No.: 56,964

[22] Filed: May 3, 1993

Related U.S. Application Data

[63] Continuation of Ser. No. 830,983, Feb. 4, 1992, abandoned, which is a continuation of Ser. No. 675,030, Mar. 25, 1991, abandoned, which is a continuation of Ser. No. 315,193, Feb. 23, 1989, abandoned, which is a continuation of Ser. No. 890,835, Jul. 25, 1986, abandoned, which is a continuation of Ser. No. 567,547, Jan. 3, 1984, Pat. No. 4,627,043.

[30] Foreign Application Priority Data

Jan. 7, 1983 [JP] Japan .................................. 58-975

[51] Int. Cl.6 .................. G11B 17/30; G11B 21/02
[52] U.S. Cl. ................... 369/215; 369/219; 369/32
[58] Field of Search ............. 369/215, 13, 32, 33, 369/41, 219, 244; 360/75, 78.05, 78.06, 78.12, 78.13

[56] References Cited

U.S. PATENT DOCUMENTS

| 4,015,289 | 3/1977 | Kinjo et al. | 360/11 |
|---|---|---|---|
| 4,030,137 | 6/1977 | Dalziel | 360/78.13 |
| 4,228,326 | 10/1980 | Dakin et al. | 369/32 |
| 4,236,232 | 11/1980 | Jansen et al. | 369/32 |
| 4,290,088 | 9/1981 | Beecroft | 360/75 |
| 4,323,997 | 4/1982 | Kuribayashi et al. | 369/33 |
| 4,399,477 | 8/1983 | Bryer | 369/215 |
| 4,473,898 | 9/1984 | Ono | 369/215 |
| 4,480,280 | 10/1984 | Sugiyama et al. | 369/41 |
| 4,488,187 | 12/1984 | Alaimo | 360/77 |
| 4,498,158 | 2/1985 | Akiyama | 369/41 |
| 4,514,837 | 4/1985 | Rosmalen | 369/215 |
| 4,555,736 | 11/1985 | Mathieu et al. | 369/41 |
| 4,627,043 | 12/1986 | Uehara | 369/215 |
| 4,677,506 | 6/1987 | Kaneko et al. | 360/77 |

Primary Examiner—Eugene R. LaRoche
Assistant Examiner—Tan Nguyen
Attorney, Agent, or Firm—Anderson Kill Olick & Oshinsky

[57] ABSTRACT

Disclosed is a head shifting apparatus for shifting a head relative to a recording medium, which comprises a shifting mechanism for shifting the head stepwise, detecting means for detecting when the head reaches a predetermined reference position and control means for controlling the shifting mechanism in such a manner that the head is shifted in a first shifting mode where the head is shifted on the basis of a predetermined first unit increment of shifting step until the head reaches the reference position, and after that when to perform normal recording or reproducing, the head is shifted in a second shifting mode where the basis is shifted on the basis of a predetermined second unit increment of shifting step larger than the first unit increment of shifting step.

11 Claims, 3 Drawing Sheets

HEAD SHIFTING APPARATUS

This is a continuation application of Ser. No. 07/830,983, filed Feb. 4, 1992 abandoned, which in turn is a continuation application of Ser. No. 07/675,030, filed Mar. 25, 1991 abandoned; which in turn is a continuation application of Ser. No. 07/315,193, filed Feb. 23, 1989 abandoned; which in turn is a continuation application of Ser. No. 06/890,835, filed Jul. 25, 1986 abandoned; and which in turn is a continuation application of Ser. No. 06/567,547, filed Jan. 3, 1984, now U.S. Pat. No. 4,627,043, which issued on Dec. 2, 1986.

BACKGROUND OF THE INVENTION

1. Field of the Invention

This invention relates to a head shifting apparatus, and more particularly to a head shifting apparatus for shifting a head intermittently or stepwise relative to a recording medium.

2. Description of the Prior Art

Most of the recording or reproducing apparatus of the type using disc-shaped recording media, for example, magnetic sheets, employ a shifting mechanism for advancing the recording or reproducing head track by track in a radial direction of the recording media, which comprises a step motor and a shifting screw connected to the output shaft of the motor. For making determination of a basic increment of shifting motion by the step motor, from a point of view of improving the precision accuracy the shifting of the head in one step for the required length of advance, for example, equal to each track pitch, is inferior to that through a plurality of steps, for example, in the case of the step motor being of 4-phase type, four steps for the same for the same track pitch, as is well known in the art. Therefore, in the prior art apparatus, the use of multi-step shifting mechanisms prevails.

Another important aspect of this type recording or reproducing apparatus is that regardless of whether in the recording or reproducing mode, whatever means must be provided for detecting when the head is set at a predetermined reference position relative to the recording medium. As is the common practice in the art, it is through the same number of steps for each track pitch when the head is shifted in a direction to the limit position that the head is then shifted in the opposite direction track to track. With such shifting control means, however, as will be fully described later, when the shifting steps of the head are disturbed by external disturbance, the head cannot be brought into accurate alignment with the reference position. This leads to a poor compatibility of the instruments.

SUMMARY OF THE INVENTION

Therefore, this invention has for its general object to eliminate all the above-described drawbacks of the prior art apparatus, and to provide a novel head shifting apparatus.

Another object of the invention is to provide a head shifting apparatus enabling the head to be automatically set at a predetermined reference position with remarkably increased accuracy, thereby it being made possible to reduce the tracking error to the recording medium and to increase the compatibility of the instrument.

Under such object, according to a preferred embodiment in which the aspect of the present invention is realized, a head shifting apparatus is proposed which includes a shifting mechanism for advancing a head stepwise, means for detecting when the head reaches a predetermined reference position and control means for controlling the shifting mechanism in such a manner that the head is shifted in a first shifting mode where the head is shifted on the basis of a predetermined first unit increment of shifting step until the detecting means detects that the head has reached the reference position, and after that a second shifting mode follows where the head is shifted on the basis of a larger predetermined second unit increment of shifting step larger than the first increment.

In this case, the control means may be arranged to control the shifting mechanism so that, for example, when the head is to be reset to the reference position, the head is shifted in the first mode.

Also with the shifting mechanism constructed so that the head is shifted at predetermined step pitches, the control means may be arranged to control the shifting mechanism in such a manner that in the first shifting mode, a predetermined first number of steps constitute one unit increment of the head shifting, and in the second shifting mode, a predetermined second number of steps greater than the first number constitute one unit increment of the head shifting.

It is noted that the term "head" herein used includes magnetic head, optical head, electrostatic capacity type head and other recording and reproducing head for recording signals on recording media and picking up the recorded signals, and further printing head in the printer, read out head in the in the readout device, and the like.

Thus, according to the present invention, when the head is shifted toward the reference position, the head is shifted on the basis of a unit increment of motion shifting step smaller than that in the normal shifting mode until the head reaches the reference position, thereby accurate adjustment of the head to the reference position can be performed. This leads to assurance that as the head moves away from the reference position to perform recording or reproducing, each shifted position of the head can be accurately determined.

Other objects and features of the invention will become apparent from the following detailed description of an embodiment thereof by reference to the accompanying drawings.

BRIEF DESCRIPTION OF THE DRAWINGS

In the following, a preferred embodiment of the present invention will be described with reference to the accompanying drawings, in which.

DETAILED DESCRIPTION OF THE PREFERRED EMBODIMENT

Figure 1:
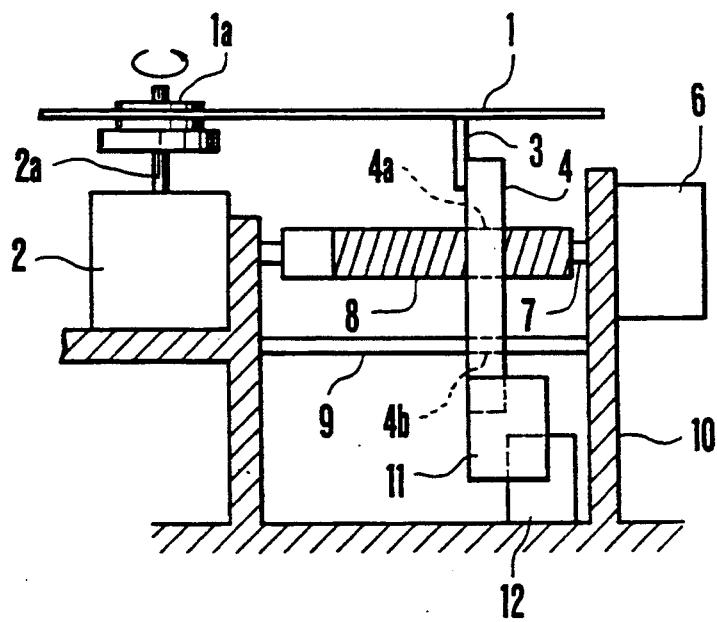
FIG. 1 is a schematic longitudinal section view of an embodiment of the head shifting apparatus to which the present invention is applicable.

FIG. 1 illustrates an example of the head shifting apparatus to which the present invention is applicable. A magnetic sheet 1 as the recording medium is connected at its center core 1a to an output shaft 2a of an electric motor 2. A recording or reproducing head 3 is fixedly secured to a carriage 4. A step motor 6 has an output shaft 7 on which is fixedly mounted a shifting screw rod 8 and which meshes with a female-threaded portion 4a of the head carriage 4. A guide 9 linearly guides the head carriage 4 as the carriage 4 moves. The carriage 4 engages with the guide 9 at its portion 4b. The step motor 6, screw rod 8 and guide 9 are installed on a chassis 10. Therefore, rotation of the output shaft 7 of step motor 6 is converted by the drive connection of the female-threaded portion 4a of head carriage 4 and the screw rod 8 to linear motion of the head carriage 4 in a lateral direction as viewed in the drawing, that is, in the radial direction of the magnetic sheet 1, thus causing the magnetic head 3 to shift stepwise in the radial direction of the magnetic sheet 1.

Figure 4:
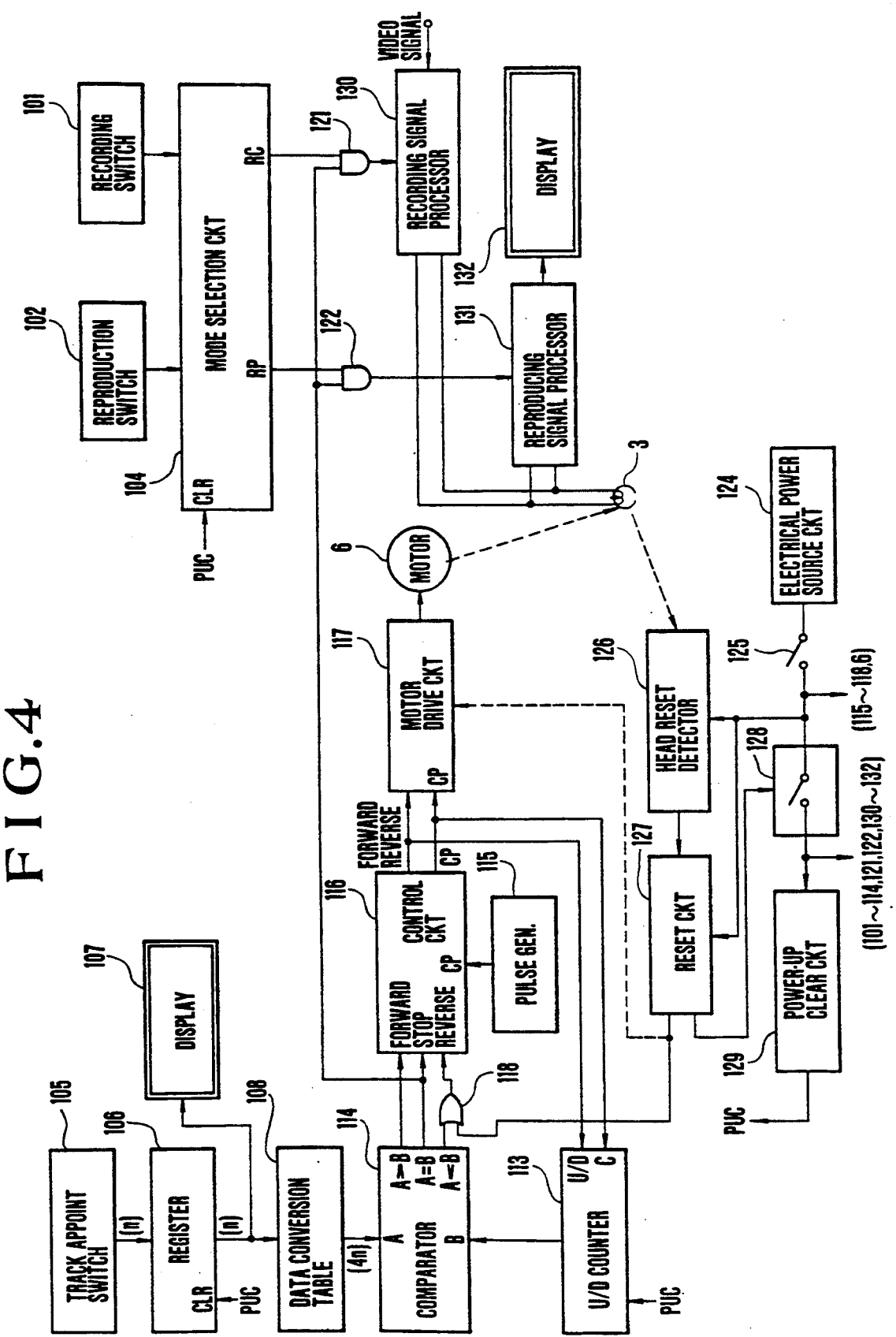
FIG. 4 is a block diagram of one embodiment of a control system according to the invention applied to the head shifting apparatus of FIG. 1.
Figure 5:
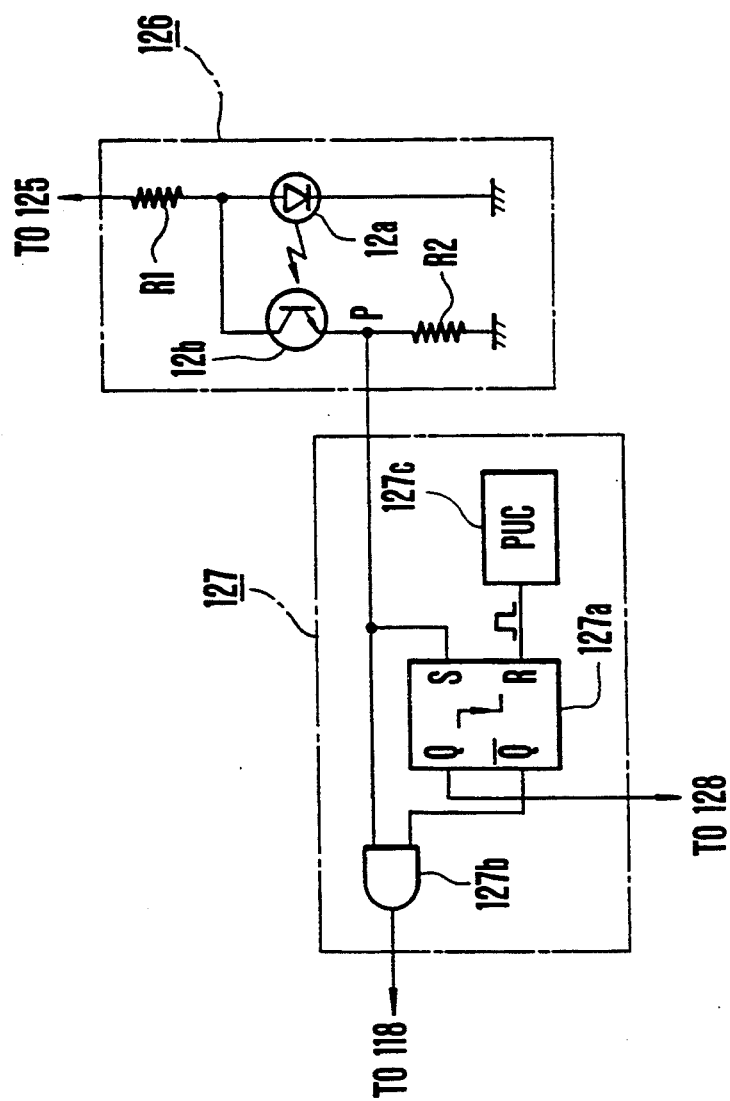
FIG. 5 is an electrical circuit diagram illustrating the details of a reference position detector and resetting circuit of FIG. 4.

A shutter plate 11 fixedly mounted on the head carriage 4 and a photo-coupler 12 constitute a head reset detector (126 of FIGS. 4 and 5).

Figure 2A:
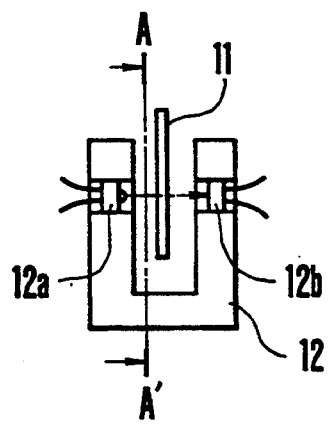
FIG. 2(A) is a side view illustrating the details of a shutter plate and a photo-coupler in the head shifting apparatus of FIG. 1.
Figure 2B:
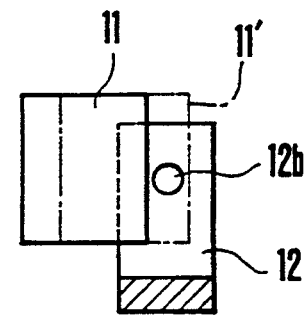
FIG. 2(B) is a sectional view taken along A–A' line of FIG. 2(A).

FIGS. 2(A) and 2(B) illustrate the details of the arrangement of the shutter plate 11 and photo-coupler 12 with FIG. 2(B) being a sectional view seen from A-A' line of FIG. 2(A). The photo-coupler 12, as is known in the art, comprises a light-emitting element 12a such as a light-emitting diode or the like and a light-receiving element 12b such as a photo-transistor or the like, the arrangement of these parts being such that light from the emitting element 12a illuminates the receiving element 12b and the shutter plate 11 intervenes therebetween when the head 3 reached the reference position (in a position indicated at 11' in FIG. 2(B)). When the light is blocked, the output of the receiving element 12b changes, which may be utilized to detect that the magnetic head 3 reached the predetermined reference position.

It is to be noted that as the head reset detector use may be made of other means of a magnetic type arranged to produce an equivalent function.

Figure 3:
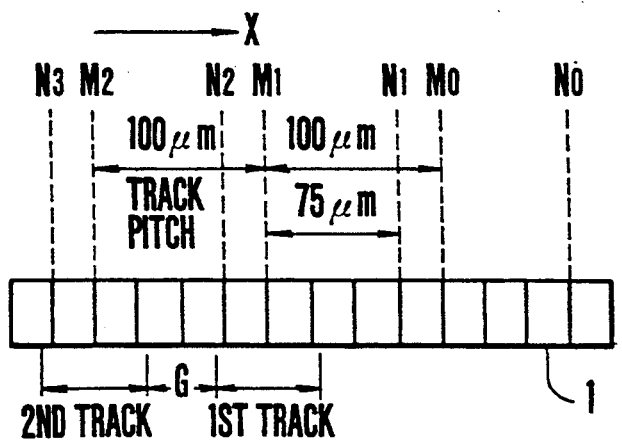
FIG. 3 is a diagram to explain relationships between the head and the recording tracks in the head shifting apparatus of FIG. 1.

FIG. 3 illustrates positional relation of the magnetic head relative to the magnetic sheet either normally or accidentally in shifting of the head across each track in either direction to and from the reference position on the basis of a predetermined number of steps as a unit of increment of shifting. In FIG. 3, the magnetic sheet is schematically shown at 1, having a track pitch of, for example, 100 $\mu$m, and the tracks are designated by a symbol M with subscrips 1, 2 ... n numbered consecutively from the outer periphery to the center (from right to left in FIG. 3). The reference position $M_0$ is set outwardly beyond the first track $M_1$ and corresponds to a position at which the shutter plate 11 just intercepts the optical path of the photo-coupler 12 and which defines the start point of shifting of the magnetic head 3. The distance between the start point $M_0$ and the center of the first track $M_1$ is assumed to be equal to the track pitch, or 100 $\mu$m. G designates a gard band between the successive tracks. The magnetic head 3 is shifted through, for example, four steps as a unit of increment for each track pitch of 100 $\mu$m. According to the prior art, the unit increment of shifting of the head 3 is left unchanged from the four steps independent of whether the head 3 is shifted in a direction indicated by arrow X from an arbitrary position on the magnetic sheet 1 to the reference position $M_0$ to reset the apparatus, or in the opposite direction from the reference position $M_0$ to a desired or appointed position at which recording or reproducing is to be performed.

When the actually detected position coincides with the reference position $M_0$, therefore, as the head 3 is later jumped to the desired position through the required number of unit increments each comprising four steps, the center of case, with the n-th track at a point $M_n$ which is spaced the magnetic head 3 is aligned with the first track at a point $M_1$, with the second track at a point $M_2$, and in general apart from the point $M_0$ by a distance equal to n times the track pitch. Thus, accurate recording or reproducing can be performed without having any head positioning or tracking error. However, if it happens that as the head is shifted toward the reference position, the center of the head 3 is aligned with an erroneous point $N_1$ by a unit four step shifting due to the external disturbance, the shutter plate 11 is not detected by the photo-coupler 12 yet, and is allowed to proceed through more four steps, so that the center of the magnetic head 3 reaches a point $N_0$ and is stopped in this position because the shutter plate 11 is detected by the photo-coupler 12 at a time on the way. Accordingly, the magnetic head 3 is moved from the position that represents the coincidence of the center of the head 3 with the point $N_0$ to a desired position in the reversed direction to that indicated by arrow X in FIG. 3. In this case, therefore, the center of the head 3 is aligned with a point $N_1$ for the first track, with a point $N_2$ for the second track, $N_3$ for the third track, and so on, as deviated from the correct point by as large as 75 $\mu$m.

Accordingly, in one embodiment of the invention, when in the normal mode of recording or reproducing operation, the magnetic head 3 is shifted by a predetermined number of steps (in the aforesaid instance, four steps) in each unit increment of shifting, and when switched to another mode for resetting the head 3 to the predetermined reference position $M_0$, the unit increment of shifting of the head 3 is made controlled to a smaller number of steps than that in the normal mode, preferably one step (25 $\mu$m in the numerical example of FIG. 3).

FIG. 4 illustrates a control system of the invention for the head shifting apparatus constructed in such a way that the magnetic head is shifted by one step until the head reaches the reference position and is then shifted from the reference position by four steps as a unit for each shifting pitch when in the normal mode of operation that follows the detection of attainment of the head on the reference position. In FIG. 4, 101 is a recording switch; 102 is a reproducing switch and 104 is a mode selection circuit. The mode selection circuit 104 is responsive to actuation of either one of the switches 101 and 102 and changes either its one output RC for the recording mode, or its another output RP for the reproducing mode, to and maintains it at, high level. And these outputs are given to respective recording and reproducing operation control AND gates 121 and 122 together with an enable signal which is produced when an "A=B" output of a comparator circuit 114 to be described later takes high level. These AND gates 121 and 122 actuate recording and reproducing signal processing circuits 130 and 131 respectively.

105 is a track appoint switch for appointing a desired track in the form of, for example, the ten key type. 106 is a register for storing data "n" related to the appointed track address appointed by the track appoint switch 105 and 107 is a display device for displaying the appointed track address stored on the register 106. The display device 107 is preferably in the form of a small-sized display device comprising a liquid crystal sell, electro-chronic element or light-emitting diode. 108 is a data conversion table comprising, for example, ROM, for producing, in this instance, "4n" as the head position setting data. Here, "4n" represents the number of steps through which the head is shifted from the reference posotion to the n-th track and is expressed in binary coded digital form on the assumption that the step motor 6 takes four steps to shift the head 3 by one track pitch.

113 is an up and down counter (hereinafter called U/D counter) for detecting the actual position of the magnetic head 3 shifted by the step motor 6 and 114 is a digital comparator circuit for comparing the output (called A) of the data conversion table 108 with the output (called B) of the U/D counter 113 to produce three different signals depending upon which of the two outputs A and B is larger or smaller, or representing "A>B", "A=B" and "A<B". 115 is a pulse generator for producing step control pulses by which the step motor 6 is driven. In the following, discussion will be made on the assumption that each pulse of the step control pulse train represents a command for shifting the head 3 by one step. 116 is a control circuit for controlling the motor 6 on the basis of the outputs of the comparator circuit 114 and the pulse generator 115. For example, in response to the high level of the output "A>B" of the comparator circuit 114 the control circuit 116 rotates motor 6 in a forward direction, in response to the high level of the output "A<S", reverses the direction of rotation of the motor 6, and in response to the high level of the output "A=B", cuts off the supply of pulses to a drive circuit 117 to stop the motor 6. It is to be noted that the control circuit 116 produces a train of pulses for driving the motor 6, and also produces a rotation direction appoint signal, and that this appoint signal when for example, of high level, represents the forward direction and when of low level, represents the reversed direction. 117 is a motor drive circuit for rotating the motor 6 in the appointed direction on the basis of the output of control circuit 116 and 118 is an OR gate having two inputs which are connected to the output "A<B" of the comparator circuit 114 and the output of a resetting circuit 127, and having an output which is connected to the reverse rotation input of the control circuit 116.

Here the magnetic head 3 is assumed to move in a direction to increase the track address when the motor 2 rotates in the forward direction, and to move in the opposite direction to decrease it when the motor 2 rotates in the reversed direction. The rotation direction appoint signal and pulses produced from the control circuit 116 are given as a count mode setting signal and count pulses respectively to the U/D counter 113. In this case, the U/D counter 113 is rendered to operate in up-counting mode by the high level of the aforesaid rotation direction appoint signal, or the appointment of the forward direction, and to operate in down-counting mode by the low level thereof, that is, the appointment of the reversed direction.

124 is an electrical power source circuit and 125 is a power switch. When the power 125 is thrown, current is supplied from the electrical power source circuit 124 to the pulse generator 115, control circuit 116, drive circuit 117, OR gate 118, pulse motor 6, a head reset detector 126 and reset circuit 127 to be more fully described later. The sheet rotating motor 2 may be also supplied with current from the power source circuit 124 by the closure of the switch 125.

The head reset detector 126 as has been mentioned in connection with FIGS. 2 and 3, detects that the magnetic head 3 reaches the reference position ($M_0$ in FIG. 3) as it moved toward that position by the photo-coupler 12 of FIG. 2 and produces a head reset completion signal which is then applied to the reset circuit 127. The reset circuit 127 continues to supply a reset command signal for commanding the resetting of the magnetic head 3 to the reference position outwardly beyond the first track of the magnetic sheet (1 of FIG. 1) through the OR gate 118 to the control circuit 116 until the resetting of the head 3 to the reference position $M_0$ is detected. In response to this reset command signal, the control circuit 116 produces the rotation direction appoint signal for rotating the motor 6 in the reversed direction and the output pulses until the reset command signal disappears.

FIG. 5 illustrates the details of the head reset detector 126 and the reset circuit 127, where the light emitting element (for example, light emitting diode) 12a and the light receiving element (for example, photo-transistor) 12b are connected through a resistor R1 to the power switch 125, and also the light receiving element 12b is connected through a resistor R2 to circuit ground. A junction point P of the light receiving element 12b and the resistor R2 is connected to a set input of a falling edge synchronizing type RS flip-flop 127a and a first input of an AND gate 127b. A power up clear circuit 127c responsive to current supply resulting from the closure of the power switch 125 produces a pulse of high level which is applied to a reset input of the RS flip-flop 127a. A Q output of the RS flip-flop 127a is connected to a control input of a switching circuit 128, and its $\overline{Q}$ output is connected to a second input of the AND gate 127b. The RS flip-flop 127a and AND gate 127b are also supplied with current when the power switch 125 is thrown.

In the circuit of such construction, when the power switch 125 is thrown, the power up clear circuit 127c produces a power up clear pulse thereby the RS flip-flop 127a is reset with its Q output becoming low level and its $\overline{Q}$ output becoming high level. Suppose that the magnetic head 3 is not in the reference position $M_0$ at a time when the power switch 125 is thrown, the light emanated from the light emitting element 12a is received by the light receiving element 12b, and the potential at the point P becomes high level. Since the two inputs of AND gate 127b simultaneously become high level, its output becomes a high level. Therefore, the output of OR gate 118 becomes high level, causing the control circuit 116 to rotate the motor 6 in the reverse direction and the magnetic head 3 to move to the reference position $M_0$. When the magnetic head 3 reaches a position corresponding to the reference position $M_0$, the shutter plate 11 intercepts the optical path between the elements 12a and 12b thereby the potential at the point P is changed to low level. This potential change is given to the set input of the RS flip-flop 127a and the flip-flop 127a is set so that its Q output becomes high level and its Q output becomes low level. Therefore, the output of the AND gate 127b and accordingly the output of OR gate 118 become low level, causing the control circuit 116 to stop the motor 6. After that when the magnetic head 3 is moved away from the reference position to an appointed track position, the interception of the optical path between elements 12a and 12b by the shutter plate 11 is released, and the potential at the point P becomes high level again. But since the RS flip-flop 127a is of the falling edge synchronizing type, the aforesaid set condition does not change.

Returning to FIG. 4, when the Q output of RS flip-flop 127a changes to high level, as this is given to the control input of the switching circuit 128, the circuit 128 turns on, thereby all the other circuit portions than those which were supplied with current from the power source circuit 124 when the switch 125 was closed are supplied with current from the circuit 124. At the same time, the power up clear circuit 129 is actuated so that the mode selection circuit 104, register 106 and U/D counter 113 are given the power up clear pulse (PUC) and these circuits are cleared or reset.

130 is a recording signal processing circuit for supplying video signals to the magnetic head 3 to effect recording on the magnetic sheet 1 and 131 is a reproducing signal processing circuit for reproducing the signals picked up by the magnetic head 3 from the sheet 1. These circuits 130 and 131 are controlled by the AND gates 121 and 122 respectively as has been described above. 132 denotes a display device for displaying the reproduced signals. The reproduced signals may be connected to an output device such as a printer.

Next, the operation of the control system of such construction and the above-described apparatus using the same is explained.

When the power switch 125 is thrown, the pulse generator 115, control circuit 116, drive circuit 117, OR gate 118, head reset detector 126, reset circuit 127, pulse motor 6 and, if necessary, the sheet rotating motor 2 of FIG. 1 are supplied with current from the power source circuit 124, and the reset circuit 127 supplies the aforesaid reset command signal through the OR gate 118 to the control circuit 116 until the magnetic head 3 is reset to the aforesaid reference position $M_0$. Thereby the control circuit 116 changes the rotation direction appoint signal to the low level, causing the drive circuit 117 to rotate the motor 6 in the reverse direction with the help of the step control pulses from the pulse generator 115. As a result, the magnetic head 3 when initially not at the reference position $M_0$, is driven to move until it reaches the reference position $M_0$. When the magnetic head 3 reaches the reference position $M_0$, the head reset detector 126 detects this and changes its output (potential at point P of FIG. 5) to low level. Therefore, the reset circuit 127 no longer produces the reset command signal to the control circuit 116. At this time, therefore, the motor 6 is stopped. Such change of the output of the head reset detector 126 to low level also causes change of the Q output of flip-flop 127a of FIG. 5 to high level which in turn causes turning on of the switching circuit 128. Thereby all the other circuits than those which were supplied with current from the power source circuit 124 when the power switch 125 was thrown are supplied with current from the circuit 124. In response to the power supply, the power up clear circuit 129 produces a power up clear pulse which is applied to the mode selection circuit 104, register 106 and U/D counter 113 and these circuits are cleared or reset. Therefore, the display device 107 indicates zero in track address.

Then when a desired track address is set by the track appoint switch 105, that track address data "n" is stored in the register 106 and is displayed by the display device 107. And the data table 108 produces data "4n" which is given to the input A of the comparator circuit 114. Applied to another input B of the comparator circuit 114 is the output of the U/D counter 113 which is, at this time, "zero". Therefore, the "A>B" output of comparator circuit 114 takes high level. In response to the high level of the "A>B" output, the control circuit 116 changes its rotation direction appoint signal to high level, appointing the forward direction of rotation of the motor 6 and puts out the motor step control pulses produced from the pulse generator 115. As a result, the drive circuit 117 rotates the motor 6 in the forward direction, and the magnetic head 3 is moved from the reference position $M_0$ to the appointed track position of the n-th address. The forward rotation command from the control circuit 116 renders the U/D counter 113 to operate in the up-counting mode to count the motor step control pulses corresponding to the stepwise shifting of the magnetic head 3. When the magnetic head 3 arrives at the track position of the n-th address, it is at this point in time that the U/D counter 113 has counted the 4n pulses. Therefore, of the outputs of the comparator circuit 114, "A=B" becomes high level. Thereby the control circuit 116 stops the outputting of the motor step control pulses. Therefore, the motor 6 stops, and the magnetic head 3 stops in this track position of the n-th address.

It will be appreciated that the magnetic head 3 is shifted in one step by one step basis until the head reaches the reference position $M_0$ and that when the head 3 is shifted from the reference position $M_0$ to the appointed track position, the unit increment of shifting constitutes four steps. Since the alignment of the head 3 to the reference position $M_0$ is performed in one step basis, therefore, without having to produce a position error of the head 3 as has been described in connection with FIG. 3, adjustment of the head 3 to the reference position $M_0$ can be controlled with high accuracy. This leads to assurance that later shifting of the head 3 in four steps basis for every one track pitch can be performed with high accuracy of alignment. Further, according to one of the features of the system of FIG. 4, each time the power switch 125 is thrown, resetting of the head 3 to the reference position $M_0$ is repeated in order to insure that when in the recording or reproducing mode, the center of the magnetic head 3 can be accurately aligned with any track on the recording medium. Notice that the terms "four steps" and "one step" herein used are intended to exemplify the different unit increments depending upon the shifting directions. What is essential in actual practice of the invention is that a unit increment of shifting of the head in the direction to the reference position is smaller than that of shifting of the head to a desired track in the normal mode of operation. Also though the aforesaid embodiment includes the data conversion table 108 which converts the track address data of "n" from the track appoint switch 105 into the data of "4n" which is then compared with the counted value of the U/D counter 113, the use of another form of the U/D counter 113 that counts one for every four pulses will provide the possibility of comparing directly the track address data "n" with the output of U/D counter 113 without recourse to the data convertion table 108.

Next, to move the magnetic head 3 to a different track position of an n'-th address after recording or reproducing at the n-th track position has been completed, the operator sets the n'-th address by the track appoint switch 105. At this time, depending upon which of the "n" and "n'" is larger or smaller, either one of the "A>B" and "A<B" outputs of the comparator circuit 114 takes high level, on the basis of which the direction of rotation of the motor 6 and the counting mode of the U/D counter 113 are determined. In principle, the magnetic head 3 is moved from the n-th to the n'-th track position in a similar way to that in moving from the reference position $M_0$ to the n-th track position as has been described above, or in the same unit increment of four steps even when the new number "n'" is younger than the number "n".

In final, the recording or reproducing mode of operation is explained below. With the magnetic head 3 brought to and stopped in the track position of the appointed address, when the recording switch 101 or the reproducing switch 102 is actuated, the mode selection circuit 104 changes either one of its recording mode control output RC and reproducing mode control output RP to high level. Since in the stopped state of the magnetic head 3 the "A=B" output of the comparataor circuit 114 is high level, the corresponding one of the outputs of AND gates 121 and 122 becomes high level. If the high level output is produced from the AND gate 121, the recording signal processing circuit 130 is rendered operative. And the video signal is processed by this processing circuit 130 for recording and is recorded through the magnetic head 3 on the appointed address track of the magnetic sheet 1 in one frame or one field. A video signal source may be a video camera which may be either included in the recording and reproducing apparatus or in separation therefrom, or a television receiver set. If the high level output is produced from the AND gate 122, the reproducing signal processing circuit 131 is rendered operative and the video signal recorded at the track of the appointed address on the magnetic sheet 1 is picked up through the magnetic head 3 and is processed by this processing circuit 131. The processed video signal is applied to the display device 132 or another output device, for example printer. The aforesaid recording or reproducing mode is released when the power switch 125 is opened, and the mode selection circuit 104 is cleared by the aforesaid power up clear pulse.

The foregoing embodiment has been described taking an example of the invention to one of the types of head shifting apparatus which is adapted to the recording and/or reproducing system using disc type magnetic sheets as the recording medium. Besides this, the principles of the invention are fully applicable to other types of the head shifting apparatus such as those in the recording and/or reproducing system using a rotary type magnetic drum as the recording medium, and also the printer or like recorder that necessitates head scanning against the recording paper, and further the read out device that necessitates scanning of the head (for example, CCD or like photo-electric scanning head) against the manuscript paper or like image bearing medium. Therefore, it is to be understood that the present invention is not confined to the illustrated embodiment, but is applicable to a wide variety of head shifting apparatus.

Also in the illustrated embodiment, the amount of rotation of the output shaft 7 of the motor 6 in one step basic for one clock pulse from the control circuit 116, that is, the amount of shifting of the head 3 in one step basic, is taken at an equal value in the opposed directions, and this is used as a basis in differentiating the increments of shifting in the opposed directions from each other. Instead of using such means, it is also possible to otherwise construct, for example, the drive circuit 117 in another form such that the magnetized phase of the motor 6 is changed over. And as illustrated by a dashed line in FIG. 4, the output of the reset circuit 127 is connected even to the drive circuit 117 also so that when the output of the reset circuit 127 is of high level, the motor 6 is operated in a predetermined first magnetizing mode, thereby, speaking in conformity with the aforesaid example, the magnetic head 3 is shifted by 25 $\mu$m for each clock pulse, and when the output of the reset circuit 127 is of low level, the motor 6 is operated in another different, or second magnetizing mode, thereby the head 3 is shifted by 100 $\mu$m for each clock pulse. In this case, it is obvious that the data conversion table 108 becomes unnecessary.

What I claim:

1. An apparatus for shifting a head, comprising:
   (A) shifting means for shifting the head, said shifting means supporting said head and having a movable carriage;
   (B) detecting means for detecting that the head reaches a mechanically absolute reference position, said detecting means having a sensor means arranged to detect a position into which said carriage is shifted by said shifting means and outputs a signal in response to detection of said carriage;
   (C) instructing means for instructing a position of said head for one of recording on and reproducing from a recording medium;
   (D) control means for controlling said shifting means, said control means causing said shifting means to shift said head toward said mechanically absolute reference position with a first shifting characteristic in response to each initiation of a "power on" condition, and changing the first shifting characteristic of said shifting means to a second shifting characteristic different from said first shifting characteristic when said detecting means detects that said head has reached said mechanically absolute reference position, said first and said second shifting characteristics relating to accuracy of positioning of the head and said first shifting characteristic being more accurate than said second shifting characteristic, said control means being arranged to control said shifting means in said second shifting characteristic when said head is shifted to the instructed position according to the instructions of said instructing means; and
   (E) at least one of recording and reproducing means for effecting at least one of a recording and a reproducing at a head position instructed by said instructing means.

2. An apparatus according to claim 1, wherein said shifting means includes a step motor, and said first shifting characteristic has a pitch per step of the step motor different from that of said second shifting characteristic.

3. An apparatus according to claim 1, wherein said shifting means includes a step motor, and said first shifting characteristic has a pitch per step of the step motor different from that of said second shifting characteristic.

4. An apparatus according to claim 1, which further comprises:

(D) power source means for supplying power to said apparatus, wherein said control means controls said shifting means to shift said head toward said reference head position when said power source means starts to supply power to said apparatus.

5. An apparatus for moving a load, comprising:
(A) moving means for moving said load;
(B) instructing means for instructing a position of said load;
(C) power supply means for supplying power to said apparatus; and
(D) control means for controlling said moving means to move said load toward a mechanically absolute reference position in said apparatus with a first control condition when said power supply means starts to supply power to said apparatus and moving said load with a second control condition different from said first control condition after said load reaches said mechanically absolute reference position, said first and said second control conditions relating to control accuracy of positioning of said load and said first control condition being more accurate than said second control condition, said control means being arranged to control said moving means in said second control condition in the case that said load is moved to the instructed position according to the instruction of said instructing means.

6. An apparatus according to claim 5, wherein said control means includes a step motor, and in which said first control condition has a pitch per step of the step motor different from that of said second control condition.

7. An apparatus according to claim 5, wherein said control means includes a step motor, and in which said first control condition has a pitch per step of the step motor different from that of said second control condition.

8. An apparatus for shifting a pick-up means, comprising:
(A) a carriage movably arranged in said apparatus for movement in a predetermined direction, said pick-up means being mounted thereon;
(B) driving means for driving said carriage in said predetermined direction thereby effecting positioning of said pick-up means;
(C) instructing means for instructing a position of said pick-up means for one of recording on and reproducing from a recording medium;
(D) detecting means arranged in said apparatus to detect a moved position of said carriage, said detecting means being arranged to produce an output signal when said carriage has reached a mechanically absolute reference position in said apparatus, said detecting means including a sensor provided so as to detect a position of said carriage;
(E) control means for controlling said driving means, said control means causing said driving means to shift said carriage in one moving direction toward said mechanically absolute reference position with a first shifting characteristic in response to each initiation of a "power on" condition, then changing the moving direction of said carriage and causing said driving means to shift said carriage in an opposite direction with a second shifting characteristic different from said first shifting characteristic when said output signal of said detecting means is output, said first and second shifting characteristics relating to accuracy of positioning of said carriage and said first shifting characteristic being more accurate than said second shifting characteristic, said control means being arranged to control said shifting means in said second shifting characteristic in the case that said pick-up means is shifted to the instructed position according to the instruction of said instructing means; and
(F) at least one of recording and reproducing means for effecting at least one of a recording and reproducing at a position of said pick-up means instructed by said instructing means.

9. An apparatus according to claim 8, wherein said driving means includes a step motor, and said first driving characteristic has a pitch per one step different from that of said second driving characteristic.

10. An apparatus according to claim 8, further comprising:
(E) power supply means for supplying power to said apparatus, wherein said control means controls said driving means to drive said carriage toward said predetermined position when said power supply means starts to supply power to said apparatus.

11. An apparatus according to claim 8, wherein said detecting means is arranged in said apparatus and includes a photosensor for optically detecting that said carriage has reached said predetermined reference position.

* * * * *